INVENTOR
CARLOS RAMIREZ JAUREGUI

BY Charles C. Baxley
ATTORNEY

Oct. 13, 1970  C. R. JAUREGUI  3,533,209
METHOD AND APPARATUS FOR LOADING AND PALLETIZING BOXES
Filed May 3, 1967

INVENTOR
CARLOS RAMIREZ JAUREGUI

INVENTOR
CARLOS RAMIREZ JAUREGUI 3,533,209
METHOD AND APPARATUS FOR LOADING
AND PALLETIZING BOXES
Carlos Ramirez Jauregui, 18 Maximino Rojas,
Mexico City, Mexico
Filed May 3, 1967, Ser. No. 641,410
Claims priority, application Mexico, May 18, 1966,
88,904
Int. Cl. B65b 5/08, 21/06
U.S. Cl. 53—26          5 Claims

ABSTRACT OF THE DISCLOSURE

This invention is directed to a combined box loading and palletizing machine in which a jack-supported pallet is placed under a loading head and a group of empty boxes are moved into position on the pallet to receive bottles from the loading head, after which the pallet is lowered one increment to receive another group of empty boxes on top of the loaded group. This process is repeated until the pallet has been loaded with a predetermined number of tiers of boxes and the loaded pallet is then removed and replaced by an empty pallet.

---

This invention relates to a machine for performing the combined operations of box loading and palletizing a plurality of loaded boxes in one or more tiers.

These two operations, placing a layer of empty boxes on a pallet and then loading same with bottles followed by lowering the loaded layer and placing another layer of empty boxes on the filled layer and loading same, is repeated until a predetermined pallet load has been reached. Then the loaded pallet is replaced by an empty pallet and the cycle is repeated. The machine of this invention thus combines in a single unit two operations that heretofore have required two separate and independently operable machines.

These principles of this palletizing operation are applicable to any containers of the same size and shape and it will be understood that the word "bottle" is intended to cover not only glass bottles, but metal, plastic, paper, or composite containers as well.

The purpose of this invention is to expedite certain types of industrial material handling operations by providing a single machine to perform two operations heretofore done by two separate machines, thus reducing capital investment, space requirements, transfer facilities and container breakage.

The characteristic details of this machine are shown in the drawings and the accompanying description.

According to the drawings the machine is formed with three auxiliary sections, namely, a bottle supporting table 1, a box supporting table 2 and a pallet support 3 that includes a jack and a conveyor 4, and a principal section that consists of the box loading head 5.

The table 1 is leg-supported and serves as a base for the top flight of a flat link conveyor that receives uncased bottles and moves them into position for engagement by the loading head 5. Side rails 6 prevent the lateral displacement of the bottles off the table and its associated conveyor.

As the bottles are advanced they are separated by a plurality of spaced parallel vertical plates 7 into columns or rows equal in number to one row of cells in a group of boxes to be loaded. A vibrator frame 8 is positioned adjacent the entrance ends of the plates 7 to assist the smooth entry of the bottles into the channels between the plates.

When the bottles reach the loading head 5, their bottoms are supported by a plurality of spaced parallel rods 9 carried by a frame 10 that is proportioned to correspond to the horizontal dimensions of the group of boxes to be filled.

The invention is illustrated in the accompanying drawings in which FIG. 1 is a view of the machine in perspective;

The rods 9 are laterally displaceable and are enclosed within rectangular frame 10 having dimensions corresponding to the overall dimensions of a group of boxes to be loaded.

Figure 1:
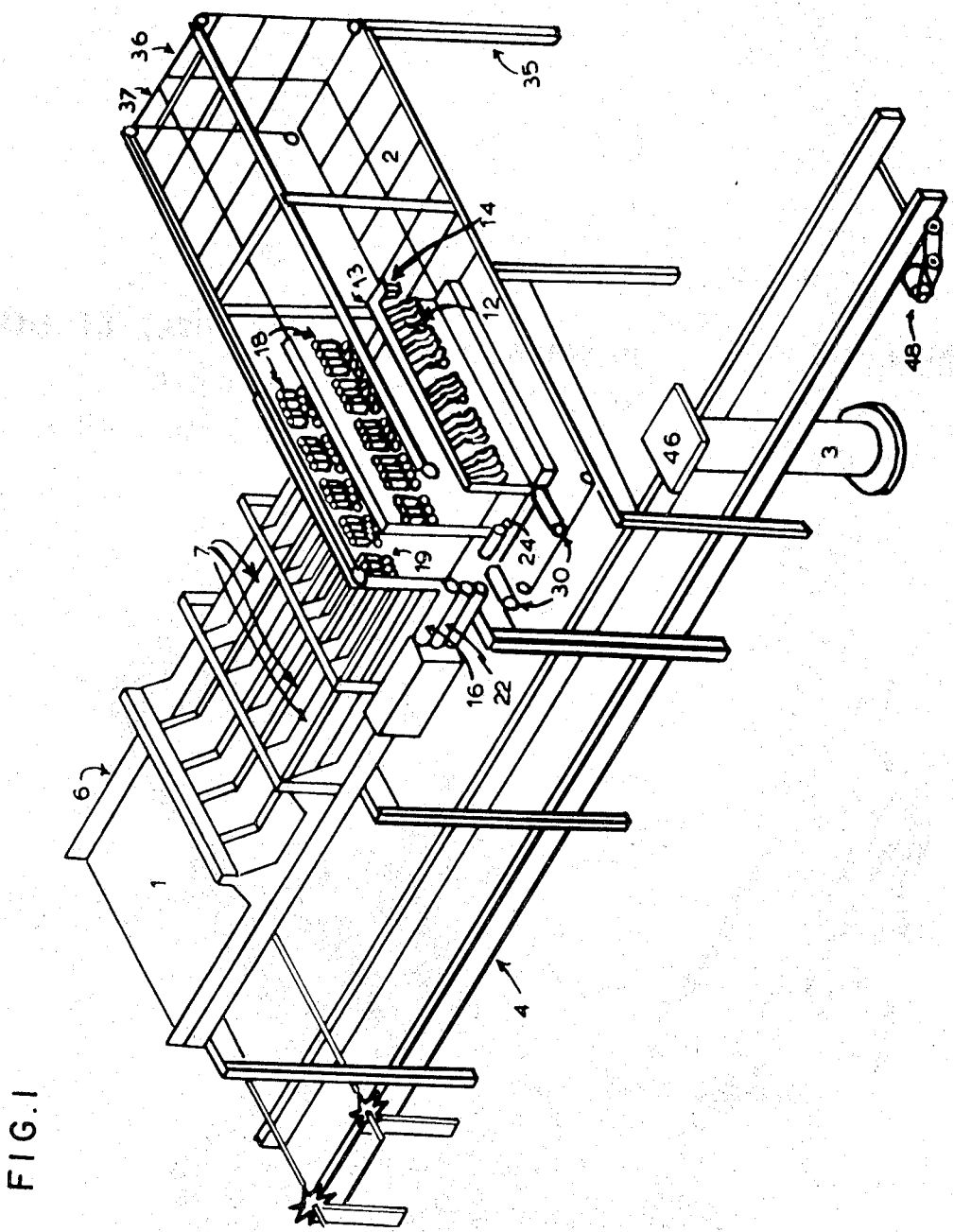
Figure 2:
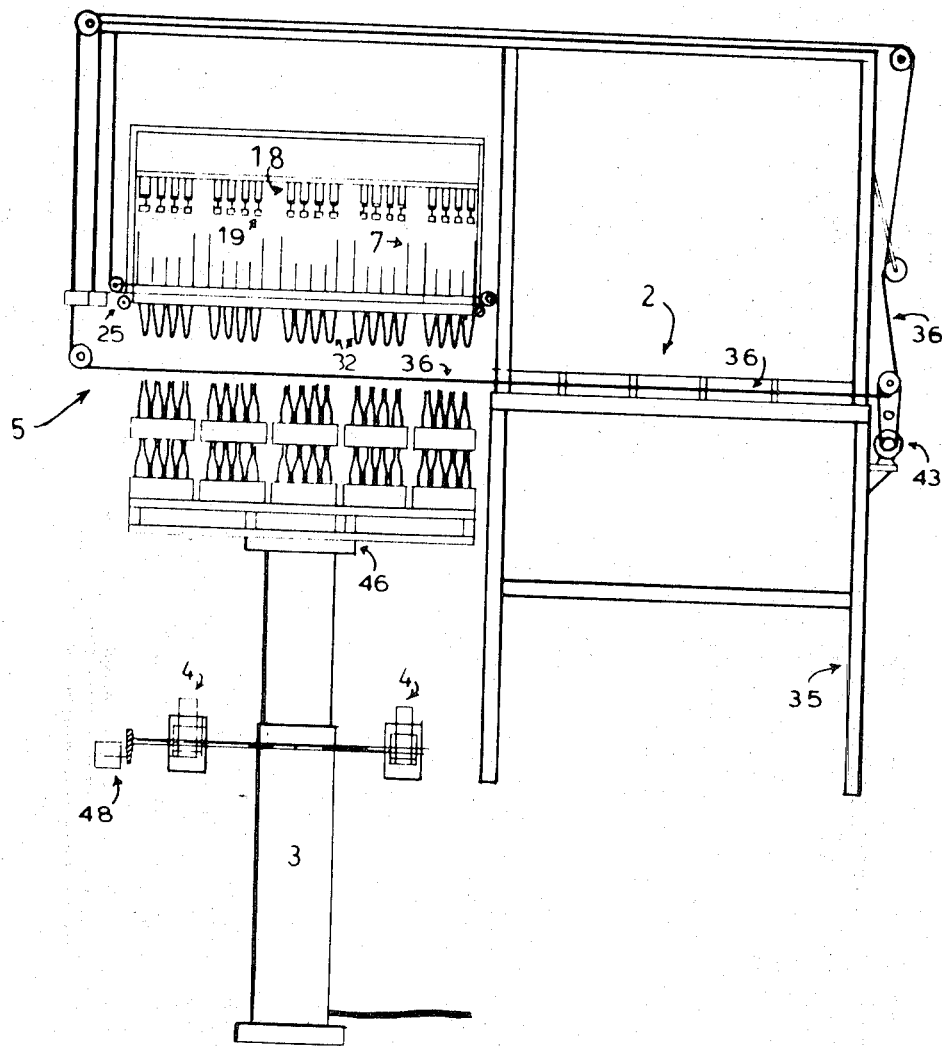
FIG. 2 is a front elevational view of the machine.
Figure 4:
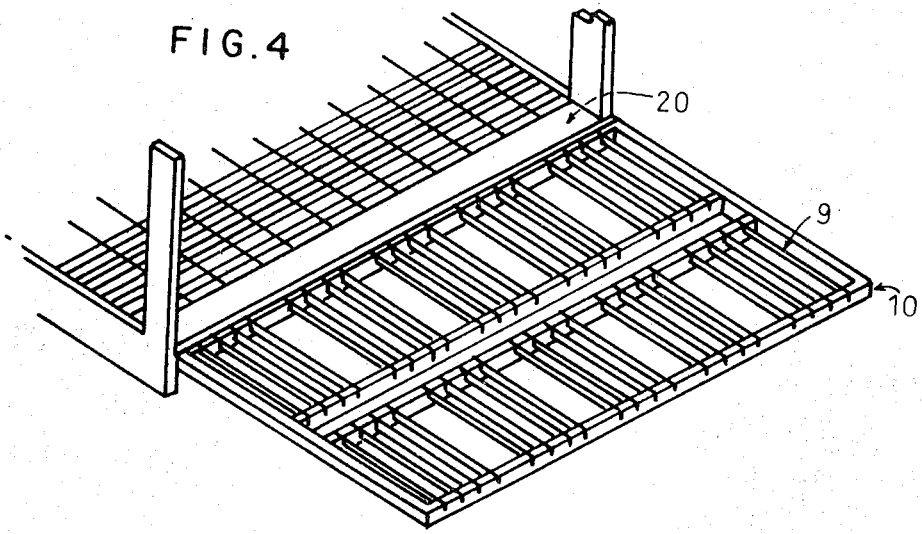
FIGS. 4–6 are perspective views of various features of the loading head.
Figure 5:
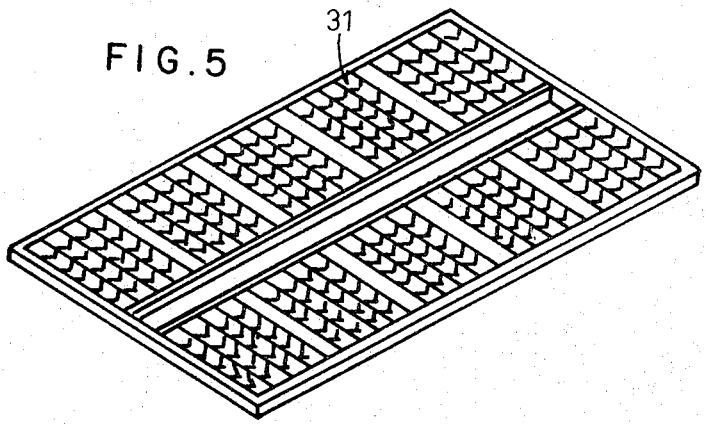
Figure 6:
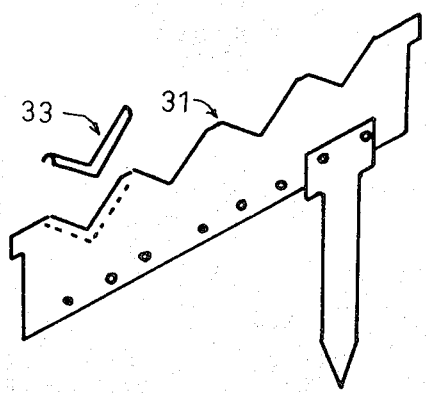
Figure 7:
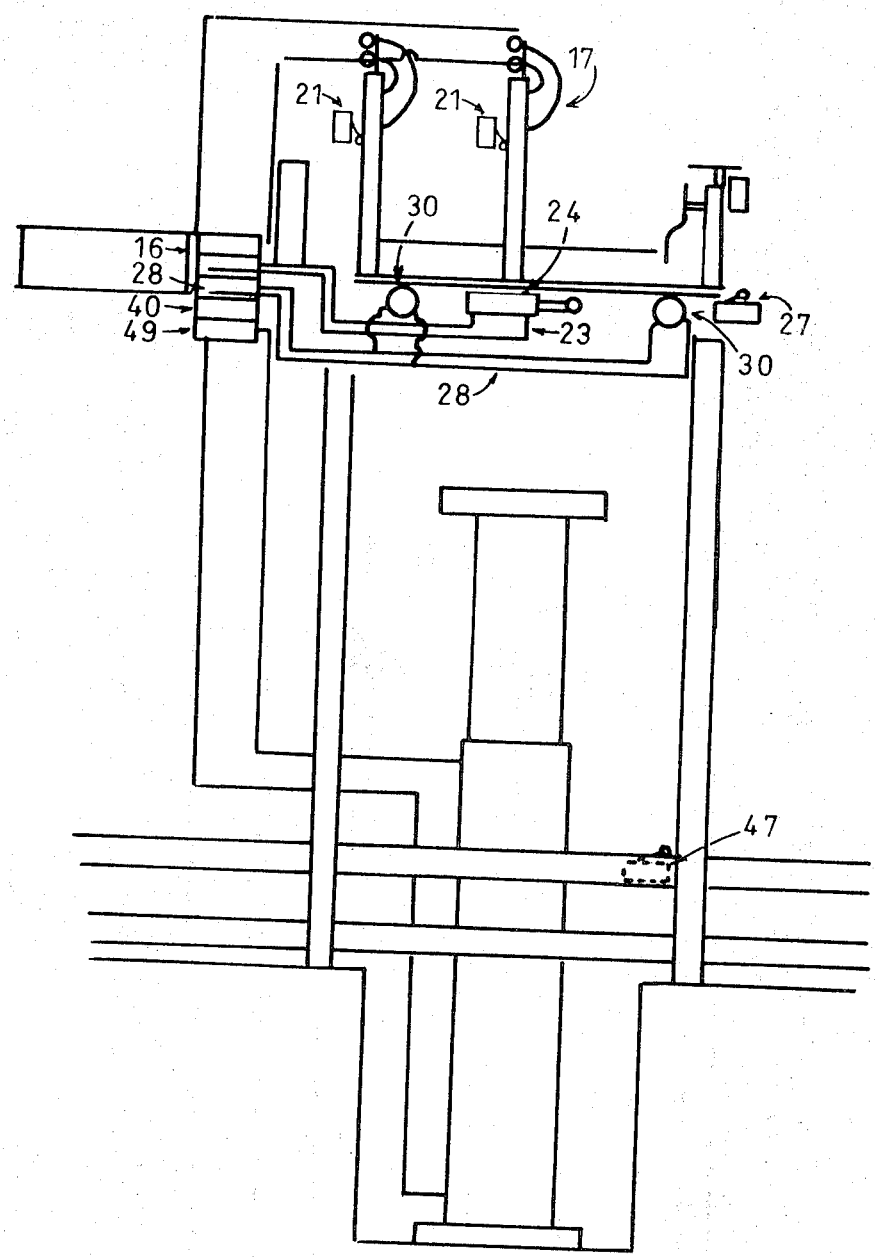
FIG. 7 is schematic drawing showing various control features.
Figure 9:
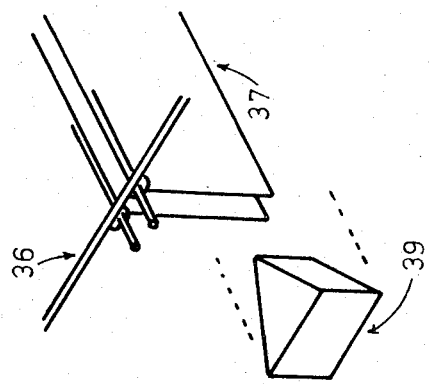
FIG. 9 is an enlarged perspective view of box clamping and release means.

The rows of bottles slidably advance along the rods 9 until the lead bottle in each row contacts a pivotally mounted stop or detent 11 that is biased by a spring 12 that is sufficiently strong to resist movement by the bottles until each row thereof on the rods 9 has become completely filled and a displacing force is applied thereto by subsequent bottles that are still on the flat link conveyor. As the stops 11 become displaced they collectively actuate a lever 13 to close a microswitch 14, mounted on a frame member 15, and operate a solenoid valve 16 (see FIG. 7) to supply air through hoses 17 to a row of vertical double acting air cylinders 18 (see FIGS. 1 and 2) that overlie a horizontal plate 20 (see FIG. 4) positioned ahead of the rods 9. The cylinders 18 are provided with rubber capped plungers 19 that engage the tops of the lateral row of bottles on the plate 20 and clamp same in place, thus permitting the bottles on the rods 9 to be further processed while preventing the advance of any following bottles.

As the plungers 19 move downwardly into bottle clamping position, one of them closes a microswitch 21 to operate a solenoid valve 22 to supply air, through hoses 23, to a double acting air cylinder 24 which advances and retracts the head 5 to and from a position in registry over the boxes to be filled.

When the head 5 reaches its forward limit of movement it closes a microswitch 27 to operate a solenoid valve 28 to supply air, through hoses 29, to a pair of double acting air cylinders 30, 30 (see FIG. 1) which laterally reciprocate the frame 10 and its rods 9. During the advance of the frame 10 the rods 9 become displaced from beneath the bottles supported thereon and the bottles become free to drop through guides into the boxes on the pallet therebelow.

These guides are defined by a cellular grid 31, each cell of which is square in horizontal cross-section and that includes a leaf spring-like retarding plate 32, reinforced as at 33, for each bottle position to slow the drop of the bottles as they pass downwardly into the boxes being loaded. The grid 31 is dependably supported from extensions of the partition plates 7 that maintain the bottles in the desired number of columns or rows.

Empty boxes are supplied to a position beneath the loading head 5 from the box supporting unit 2. This unit includes a level platform 34 supported by legs 35. A pair of spaced parallel conveyor chains 36, 36 which follow a rectangular path above the platform 34, are provided with a plurality of pairs of spaced parallel bars 37 extending therebetween. Each bar 37 is provided with a short outwardly extending clamp plate. The spacing between the pairs of bars 37 corresponds to a predetermined dimension of the boxes to be loaded so that the boxes may fit therebetween and be advanced by the lower horizontal flight of the chains 36 as required. In the illustrated embodiment of the invention ten boxes, in a 2 x 5 arrangement, are to be loaded at each cycle of operation and the platform 34 and conveyor 36 are proportioned accordingly.

As the chains 36 advance along the lower horizontal flight the ends of the bars 37 are received within the grooves of a pair of laterally movable spaced parallel horizontal guides 38, 38 which maintain the chains and the clamp plates carried thereby at a predetermined height above the platform 34.

A wedge 39 is dependably and pivotally attached to the chains 36 at each position of a pair of the bars 37 with the pointed edge thereof in registry between the clamped plates.

Open top boxes now are manually loaded into the ten spaces defined by the chains 36 and the bar sets 37 with the last box inserted into the space within which a microswitch 39b is located in the platform 34. The placing of this last box closes the microswitch 39b to actuate a solenoid valve 40 to supply air to a plurality of double acting air cylinders having plungers 41 which act against pusher plates 42 to move the horizontal guides 38 toward each other and cause the wedges 39 to pivot into the spaces between the clamp plates on the bars 37 and thus separate the plates into box-clamping positions.

Figure 8:
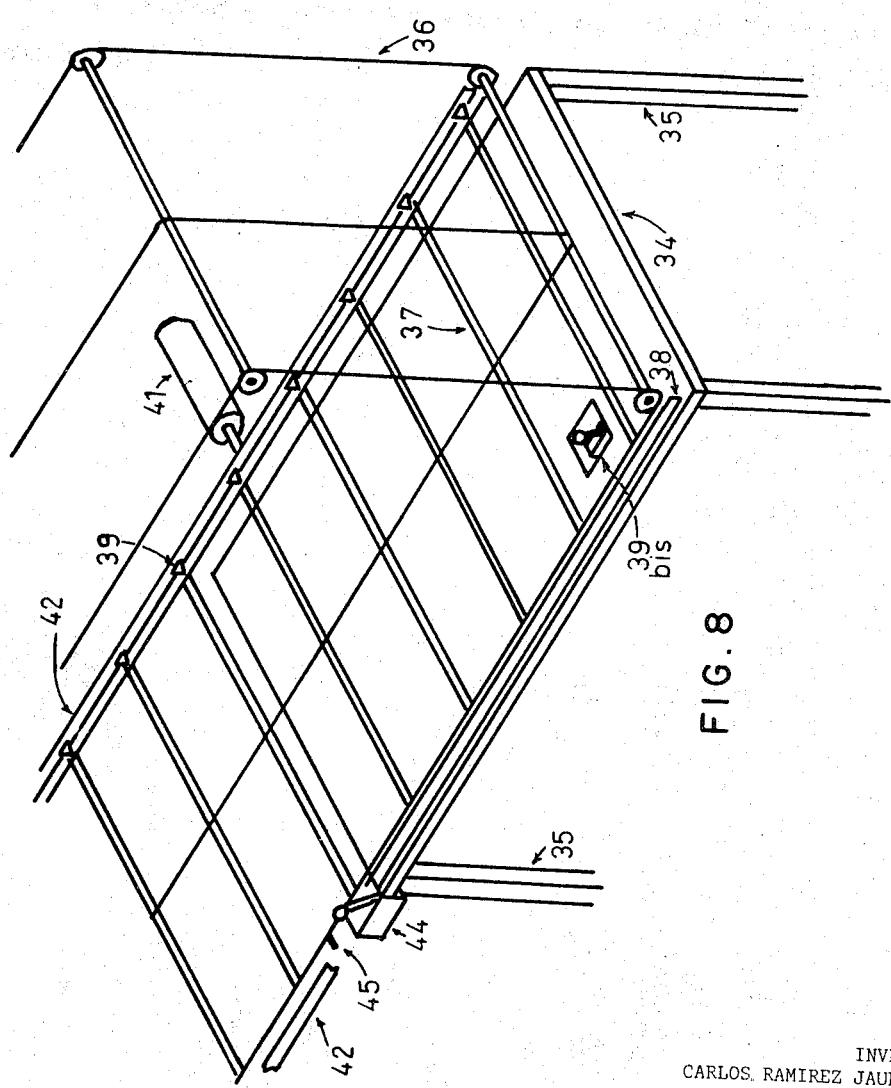
FIG. 8 is a perspective view of the box support and supply unit.
Figure 10:
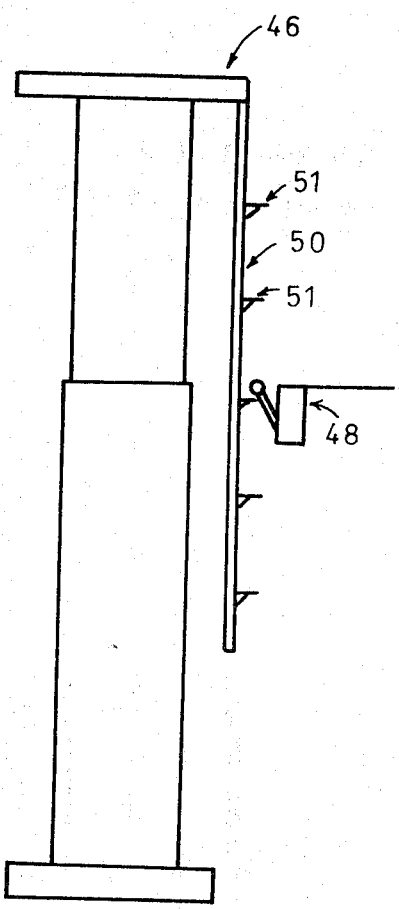
FIG. 10 shows the control for the hydraulic jack.

The closing of the microswitch 39b simultaneously causes the chains 36 and the boxes to be advanced to a position in registry with the loading head 5. The advance of the chains is stopped by a trip arm 45 thereon (see FIG. 8) that closes a microswtich 44 that not only functions to stop the chains but also causes actuation of the plungers 30 to displace the rods 9 from beneath the bottles and permit same to drop into the boxes through the retarding grid 31.

The same signal that stops the chain and actuates the plungers 30 also causes reverse action of the plungers 41 to separate the guides 38, 38 and permit the wedges 39 to withdraw from their positions between the clamp plates on the bar sets 37 and thus release the boxes which drop a short distance onto a pallet that is supported in registry with the loading head 5.

The hydraulic jack 3, which is installed in a floor pit in registry with the loading head 5, is employed to support a pallet and lower the pallet in downward increments as successive tiers of boxes thereon become loaded. The operation starts with the jack platform 46 in its lowest position and a pallet is supplied thereto by the chain conveyor 4, the chains of which are far enough apart to permit access by a fork-lift truck at the discharge end.

Figure 3:
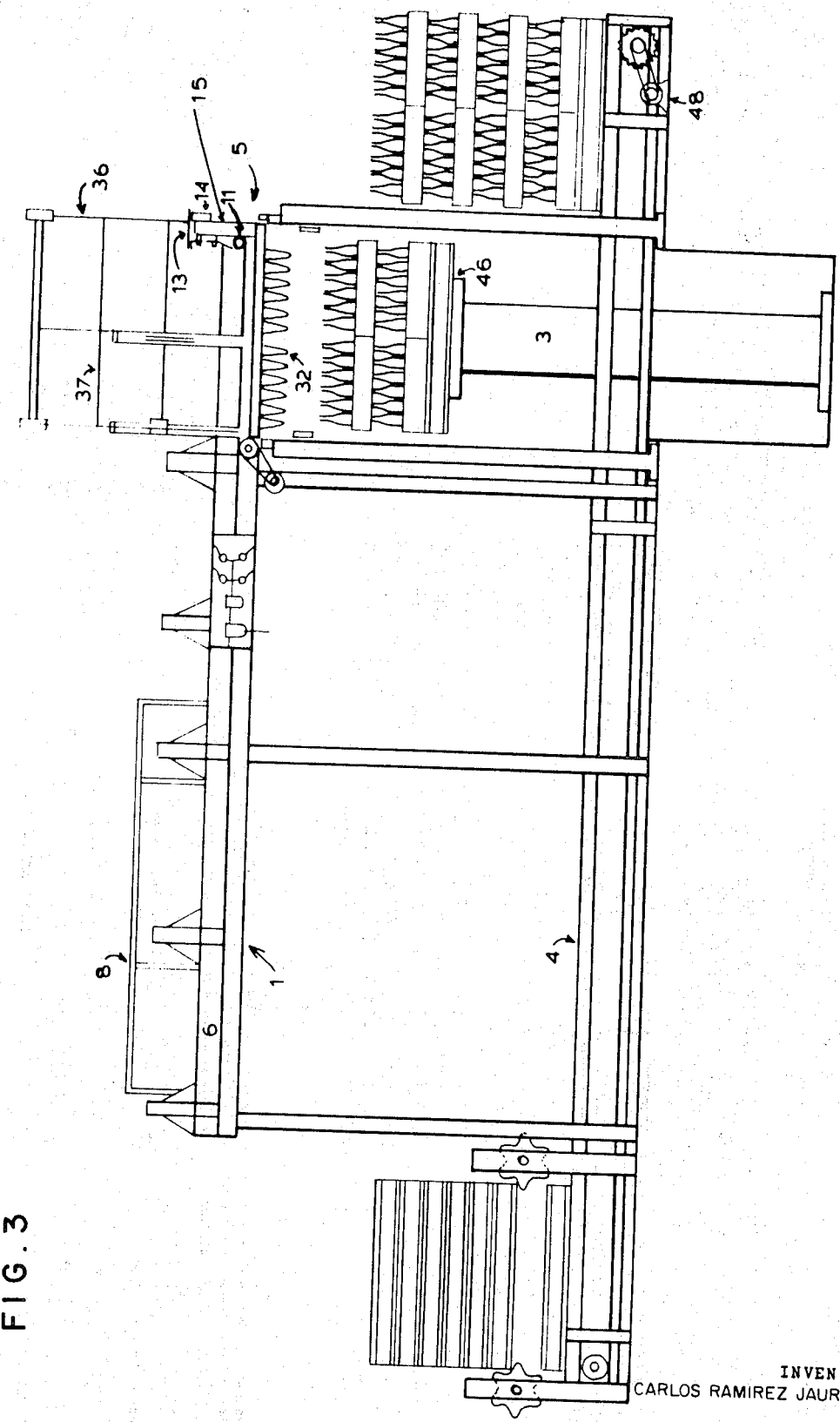
FIG. 3 is a side elevational view of the machine.

The pallets may be placed on the conveyor by hand or may be supplied from a magazine (see FIG. 3) provided with four metering star wheels, having a pitch equal to the pallet height, and arranged in two pairs on parallel shafts for engagement with two opposite sides of the bottom pallet in the magazine. The star wheel shafts are braked and to deposit a pallet on the conveyor it is only necessary to momentarily release the brakes to obtain a one tooth turn of the star wheels to release the bottom pallet from the magazine.

The pallet is advanced by the conveyor 4 to a position overlying the platform 46 and the conveyor is stopped when the leading edge of the pallet actuates a microswitch 47 to shut off power to the conveyor drive motor 48. The microswitch 47 also actuates a solenoid valve 49 to raise the jack so that the top of the pallet on the platform 46 is positioned at the level just below the plane of the box table or platform 34.

At this stage the bottle supporting rods 9 have become laterally displaced to permit the bottles to drop into the boxes and the boxes have been released from the clamp plates on the conveyor plates on the conveyor bars 37 and rest on the top of the pallet.

Now the microswitch 27 has also caused an electric signal to effect the downward movement of the hydraulic jack a distance equal to the height of the bottles in the boxes plus the thickness of the box bottoms in order that the tops of the loaded bottles will be in position to receive and support a second tier of boxes to be loaded. This operation is repeated until the jack platform 46 again reaches its lowermost position and a predetermined number of tiers of boxes have been loaded on the pallet.

At this point the conveyor 4 again becomes operative to remove the loaded pallet from the jack platform 46 and replace it with an empty pallet. After the empty pallet thus has been positioned and the conveyor again stopped, the loaded pallet is removed from the discharge end of the conveyor by a fork-lift truck or other suitable means.

The downward incremental movements of the jack after each tier of boxes has been loaded are controlled by a depending rod 50 affixed to the platform 46 and provided with a plurality of spaced lugs 51 that successively actuate a fixed microswitch 48b that controls the hydraulic and electrical circuit of the jack.

To summarize, this invention provides a single machine for loading and palletizing boxes that includes a loading head, devices for feeding a plurality of rows of bottles to the loading head, a jack for positioning a pallet in proximity to the loading head, feeding means for positioning successive groups of open top boxes on the jack-supported pallet, means for lowering the jack one increment after each successive tier of boxes has been loaded, and means for automatically positioning an empty pallet on the jack at the beginning of each cycle of operation and for removing a previously loaded pallet therefrom. It will be further understood that the machine is so timed that a fresh group of boxes will not be advanced by the conveyor chains 36 until the previously loaded group thereof has been lowered one increment by the jack 3 to provide clearance. Similarly, it will be understood that after the bottle supporting rods 9 in the loading head 5 have returned to their normal bottle-supporting positions, the plungers 19 of the air cylinders 18 will be retracted to release the next group of bottles from the bottle conveyor.

What is claimed is:

1. In a machine for loading and palletizing boxes, a loading head, means for feeding a plurality of rows of bottles to said loading head, a vertically adjustable pallet support positioned beneath said loading head, means for positioning a pallet on said pallet support, means for raising said pallet support to position said pallet into proximity with said loading head, means for feeding a group comprising a plurality of open top boxes onto said pallet and in registry with said loading head, and means for then causing said bottles to be deposited in said boxes from said loading head.

2. The machine of claim 1 additionally including means for lowering said pallet support one increment after each said group of boxes has been loaded, the height of said increment being at least equal to the height of said bottles plus the thickness of the bottom of a box, whereby to cause successive tiers of filled boxes to become stacked on each other until said pallet is filled with a predetermined number of tiers.

3. The machine of claim 2 in which said pallet positioning means is also effective to remove a loaded pallet from said pallet support after said pallet support reaches its lowermost position.

4. In a method of loading and palletizing boxes the steps of, assembling a plurality rows of bottles, placing a pallet beneath said bottles in proximity thereto, depositing a group of open top emtpy boxes on said pallet in registry with said bottles, depositing said bottles in said boxes, lowering said pallet a distance sufficient to permit another group of empty boxes to be deposited on said group of loaded boxes, depositing another group of empty boxes on said group of loaded boxes, and assembling another plurality of rows of bottles and depositing same in said another group of empty boxes.

5. The method of claim 4 additionally including the steps of successively lowering said pallet after each new group of empty boxes has become filled whereby to build up a plurality of tiers of filled boxes stacked on each other until a predetermined number of tiers has been reached, then replacing the filled pallet with an empty pallet, and then repeating all of said steps.

References Cited

UNITED STATES PATENTS

| | | | |
|---|---|---|---|
| 2,252,127 | 8/1941 | Kimball | 53—166 |
| 2,701,650 | 2/1955 | Stevenson | 53—162 XR |
| 2,966,018 | 12/1960 | Currie | 53—247 XR |
| 3,353,331 | 11/1967 | Rowekamp | 53—166 |

THERON E. CONDON, Primary Examiner

R. L. SPRUILL, Assistant Examiner

U.S. Cl. X.R.

53—26, 245, 248, 250